Sept. 11, 1962 O. WERNER 3,054,043

CIRCUIT ARRANGEMENT FOR SUPPLYING A CONSUMER WITH A CONSTANT VOLTAGE

Filed Dec. 18, 1958 2 Sheets-Sheet 1

Sept. 11, 1962 O. WERNER 3,054,043

CIRCUIT ARRANGEMENT FOR SUPPLYING A CONSUMER WITH A CONSTANT VOLTAGE

Filed Dec. 18, 1958 2 Sheets-Sheet 2

United States Patent Office 3,054,043

Patented Sept. 11, 1962

3,054,043

CIRCUIT ARRANGEMENT FOR SUPPLYING A CONSUMER WITH A CONSTANT VOLTAGE

Otto Werner, Berlin-Siemensstadt, Germany, assignor to Siemens-Schuckertwerke Aktiengesellschaft, Berlin-Siemensstadt and Erlangen, a stock company of Germany Filed Dec. 18, 1958, Ser. No. 781,245
Claims priority, application Germany Dec. 20, 1957
6 Claims. (Cl. 323—22)

My invention relates to devices for supplying a load with a constant voltage. It is desirable for such devices that they regulate the constant voltage with the greatest possible accuracy and with a minimum of sluggishness and require a minimum of equipment. According to the invention this object is attained by supplying the load current through a series resistance and by connecting across the load an auxiliary shunt circuit including a transistor whose conductivity is controlled in dependence on the difference between the load voltage and a reference voltage from a constant voltage-drop diode. Preferably a Zener diode may be used for this purpose, i.e. a diode which operates on the Zener portion of its characteristic in the blocking direction.

When the output voltage of the device tends to rise, the conductivity of the transistor in the auxiliary circuit is increased so that the transistor permits passage of a larger current through the auxiliary circuit, such current being derived from the source supplying the current to the load through the series resistance. As a result, a larger voltage drop is produced on this series resistance, whereby the output voltage supplied to the load is reduced accordingly.

Various preferred embodiments of my invention are illustrated in the accompanying drawings in which.

Figure 1:
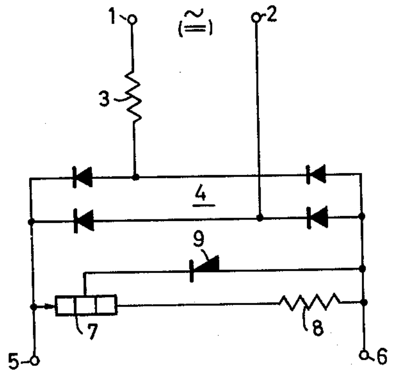
FIG. 1 is a circuit diagram of a very simple device.

In FIG. 1 the input terminals 1 and 2 for connecting the device to the alternating-current line of a suitable supply system are connected through an ohmic resistor 3 and a rectifier bridge 4 with the output terminals 5 and 6 to be connected with the load. An auxiliary circuit is shunted across the terminals 5, 6 and comprises a transistor 7, in series with a resistor 8. A Zener diode 9 has one electrode connected to the negative load terminal 6 and has its other electrode connected to the base of the transistor 7 which, in this embodiment, is a transistor of the p-n-p type.

Let it be assumed, for instance, that the voltage of the output terminals 5 and 6 tends to rise on account of a change of the voltage at the input terminals 1 and 2 or on account of a change of the load. In that event the conductivity of the transistor 7 is increased by the increase in control voltage supplied to the transistor, such increase resulting from the fact that the difference between the output voltage at the terminals 5, 6 and the constant Zener voltage of the diode is the effective voltage controlling the transistor. The increased conductivity of the transistor causes the current flowing through transistor 7 and resistor 8 to increase. As a result, the voltage drop at the series resistance 3 is increased so that the voltage supplied to the rectifier 4 is reduced, thus producing a consequent reduction in output voltage at terminals 5 and 6.

A reduction of the output voltage at the terminals 5 and 6 would reduce the conductivity of the transistor 7 so that the current through transistor 7 and resistor 8 decreases and causes a corresponding decrease of the voltage drop at the resistor 3 ahead of the rectifier 4. As a result, the voltage supplied to the rectifier 4 and the voltage at the output terminals 5 and 6 rise accordingly.

The resistor 8 in the auxiliary circuit may be dispensed with if only small output energies are to be supplied, since the function of this series resistor may then be performed directly by the transistor itself.

The device illustrated in FIG. 1 may be operated with alternating current or with direct current, this being indicated in FIG. 1 by the symbols for both kinds of currents. When the device is operated with alternating voltage, the full output voltage is attained during each such periods only in which the instantaneous magnitude of the input voltage is larger than the required output of direct voltage. A non-undulating direct output voltage is obtained by connecting a capacitor across the direct current terminals of the rectifier 4 and, as the case may be, by additionally inserting an ohmic resistor between the rectifier 4 and the auxiliary circuit.

The type of device illustrated in FIG. 1 gives satisfactory results for comparatively small output energies only, because the transistor 7 is continuously controlled and the heat losses in the transistor limit the energy controllable by the transistor to a comparatively low permissible magnitude. A device according to the invention, however, may be modified for supplying higher output energies. For this purpose, the continuously controlled transistor is substituted by a switching transistor. This requires imposing upon the switching transistor a predetermined ratio of the duration of its blocked condition to the duration of its conductive condition, such ratio being controlled in dependence on the load voltage.

Figure 2:
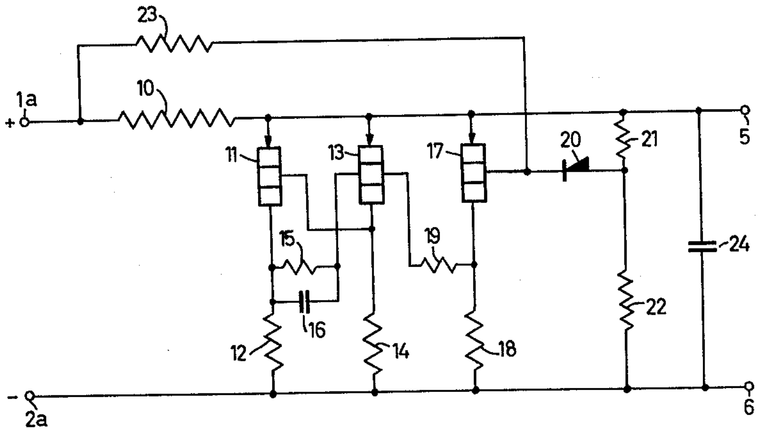
FIG. 2 is a circuit diagram of a modified device.

Such an embodiment of my invention is illustrated in FIG. 2. In this figure, 1*a* and 2*a* denote the input terminals connected to a suitable source of direct current. 5 and 6 denote the output terminals connected to a load, and 10 denotes the series resistance leading to the load. The auxiliary shunt circuit is formed by the transistor 11 and the resistor 12 connected in series. The transistor 11 and the resistor 12 also form part of a bistable flip-flop network which includes an additional transistor 13, a resistor 14 and a coupling which comprises a resistor 15 in parallel connection with a capacitor 16. This bi-stable flip-flop network is controlled by a transistor 17 in series with a resistor 18. A resistor 19 has one terminal connected to the lead connecting the transistor 17 with the resistor 18 and has its other terminal connected to the base of the transistor 13. The transistor 17 is controlled by impressing upon its emitter base circuit a voltage which is the difference between the potential prevailing at a resistor 21 and the potential prevailing at the Zener diode 20. The resistor 21 is connected in series with a resistor 22, both being connected across the output terminals 5 and 6 for supplying the constant load voltage. The resistors 21 and 22 thus constitute a voltage divider, and the tap potential at the resistor 21 is used for the comparison with the potential at the Zener diode 20 for the purpose of impressing the control voltage upon the emitter base circuit of the transistor 17. A capacitor 24 is connected across the load terminals 5, 6 to function as an energy accumulator. It supplies energy to the load as soon as the auxiliary shunt circuit is rendered operative, and it is charged again as soon as the auxiliary circuit is cut off. As explained, the Zener diode 20 serves to furnish the selected standard voltage. A continuous voltage drop must prevail at this diode. Therefore, in operation, the Zener diode is permanently charged with a current caused by the input voltage at terminals 1*a* and 2*a* and flowing through the resistor 23, the diode 20 and the resistor 22.

The embodiment of my invention illustrated in FIG. 2 functions as follows: Let it be assumed, for instance, that the load voltage at the terminals 5 and 6 drops for any reason. As a result, the share of the voltage prevailing at the voltage divider resistance 21 decreases accordingly and causes the emitter-base voltage of transistor 17 to be reduced. Consequently, the conductivity of transistor 17 is reduced and the transistor 13 is supplied by means of resistors 19 and 18 with a control current which increases the conductivity of transistor 13. Since the control circuit of transistor 13 is coupled with the output of the transistor 11, and the control portion of transistor 11 is coupled with the output of transistor 13, this change in conductivity of transistor 13 is effective to block the transistor 11 entirely. Hence, the auxiliary circuit 11—12 is cut off by the reduction of load-terminal voltage. As a result, the energy storing capacitor 24 is charged by a current amounting substantially to the difference between the current flowing through the series resistance 10 and the current supplied to the load. The voltage at the terminals 5 and 6 rises in correspondence with the charging of the capacitor 24 until the tap potential at resistor 21 exceeds the Zener voltage of the diode 20 to such an extent that the consequent increase of the conductivity of the transistor 17 causes the transistor 13 to be blocked and the transistor 11 to become conductive in the manner of a switch. Owing to this re-closing of the auxiliary circuit including the transistor 11 and the resistor 12, the capacitor 24 is discharged again because the sum of the current supplied to the load through terminals 5, 6 plus the current flowing through the auxiliary load circuit 11, 12 is larger than the current supplied through the series resistance 10. Consequently, the voltage at the load terminals 5 and 6 again decreases.

Figure 3:
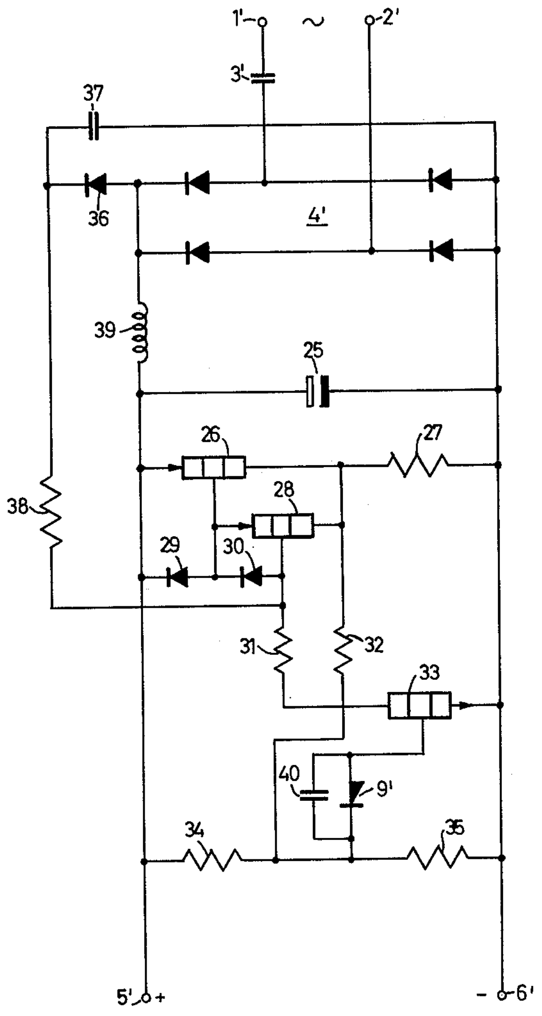
FIG. 3 illustrates a modification of the device shown in FIG. 2.

The device illustrated in FIG. 2 may be simplified and improved as shown in FIG. 3. While in the embodiment of FIG. 2 the diode-controlled transistor 17 for switching the flip-flop network is a component separate from that network, the corresponding diode-controlled transistor 33 in FIG. 3 is an integral element of the flip-flop network. Moreover, it is avoided that a permanent current, having the magnitude of the current used for controlling the transistor in the auxiliary shunt circuit, flows in the system as a load, such loading being incurred in FIG. 2. The device shown in FIG. 3 is supplied with alternating current from an alternating-current line. Elements identical with corresponding elements in FIG. 1 are denoted by the same reference numerals which are primed, however.

In this device, the load connected to the output terminals 5' and 6' is supplied with current from the alternating line connected to the input terminals 1' and 2' through a capacitor 3' constituting the series resistance. The alternating current is rectified in a rectifier 4' and passes through a choke 39 serving, together with a capacitor 25, to filter the direct voltage. A voltage divider is connected across the output terminals 5', 6' and comprises resistors 34 and 35. The potential derived from the resistor 35 is compared with the voltage drop at the Zener diode 9' to furnish the selected voltage as the difference between the two potentials. This selected voltage serves to control the transistor 33. The diode 9' is biased with a current in such a manner that it always operates on the Zener portion of its characteristic. In this embodiment the bias current is supplied from the terminal 5' through the resistor 34 and flows through the Zener diode and the base-emitter portion of the transistor 33 to the terminal 6'. The transistor 33 is never completely blocked but permanently permits at least a small current to pass through its control portion, such current insuring that the Zener diode 9' is biased to the degree required for operation on the Zener portion of its characteristic. If the required bias of the diode cannot be attained in this manner, a capacitor 40 may be shunted across the diode.

This embodiment of my invention also comprises a flip-flop network. This network includes the voltage divider resistors 34, 35 as well as the Zener diode 9', the transistor 33 and the circuit elements 26 through 32. The transistor 26 is connected in series with the resistor 27 between the positive terminal 5' and the negative terminal 6'. A circuit point between the transistor 26 and the resistor 27 is connected through the resistor 32 with the lead interconnecting the resistors 34 and 35. This provides a feed-back upon the control circuit of the transistor 33. The transistors 33, 28 and 26 in the sequence described constitute a cascade network. The transistors 26 and 28 are of the opposite conductive type as the transistor 33, i.e. of the p-n-p type rather than of the n-p-n type.

The operation of this device is the following. Upon a small change of the voltage controlling the transistor 33, occasioned by a change in output voltage at the terminals 5' and 6', the control current of the cascade comprising the transistors 26 and 28 is likewise changed. Consequently, the potential between the transistor 26 and the resistor 27 changes and this change acts through the resistor 32 upon the voltage divider potential at the resistor 35 in such a sense that the change of the controlling emitter-base voltage for the transistor 33 is increased. With the resistor 32 suitably dimensioned, a small variation of the output voltage between terminals 5' and 6' causes the transistors 26 and 28 to become fully conductive or to be fully blocked in the manner of a switch. Therefore, in event of an increase of the output voltage the auxiliary circuit, including the transistor 26 and the resistor 27, is closed, whereby the output voltage across terminals 5' and 6' is reduced in porportion to the discharge of the electrical energy accumulators 39 and 25. In event of a reduction of output voltage at terminals 5', 6', the auxiliary shunt circuit is again cut off. As described hereinabove, the transistors 26 and 28 operate as switches being either fully conductive or fully blocked.

It will be understood that the energy accumulators 25 and 39, acting substantially in the same manner as the capacitor 24 of FIG. 2, are also active to smoothen the output current.

In order to insure a satisfactory blocking of the transistors 26 and 28 during the blocking phase, the device shown in FIG. 3 is provided with auxiliary means comprising two valve diodes 29 and 30 shunt-connected across the base-emitter circuits of the respective transistors 26 and 28. During the off intervals of the transistors 26 and 28, a current passes through diodes 29 and 30 in the forward direction, such current being limited by a resistor 38. The voltage causing such current to flow is the voltage prevailing at a capacitor 37 minus the output voltage at the terminals 5', 6'. The voltage at the condenser 37 is determined by the maximum value of the direct voltage at the rectifier 4', the diode 36 preventing a discharge of the capacitor through the choke 39 and the load connected to the output terminals 5', 6'.

While the invention has been described in connection with a number of preferred embodiments, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A device for energizing a load with a constant voltage comprising direct-voltage energy means connected across said load and having a series connected resistor, a capacitor connected parallel to said load, saturable switching transistor means having a collector-emitter path connected parallel with the load and having a base, and transistor trigger means connected with said first transistor means to form a bistable flip-flop for abruptly switching said first transistor means between on and off conditions in respective response to rise and fall of the load voltage from a datum voltage.

2. A device for energizing a load with a constant voltage comprising direct-voltage supply means connected across said load and having a series connected resistor, a capacitor connected parallel to said load, saturable switching transistor means having a collector-emitter path connected parallel with the load and a base, and trigger means including second transistor means connected with said first transistor means to form a flip-flop for abruptly switching said first transistor means between on and off in respective dependence upon the rise and fall of said load voltage from a datum voltage, and Zener and diode means is said trigger means for establishing the datum voltage.

3. A device for energizing a load with a constant voltage comprising direct-voltage supply means connected across said load and having a series connected resistor, a capacitor connected parellel to said load, saturable switching transistor means having a collector-emitter path connected parallel with the load and having a base, and trigger means including second transistor means connected with said first transistor means to form a flip-flop for abruptly switching said first transistor means between on and off condition and a control transistor connected to the flip-flop circuit to control its operation in dependence upon the rise and fall of the load voltage from a datum voltage, Zener diode means in said trigger means for establishing the datum voltage.

4. A device for energizing a load with a constant voltage, comprising direct-voltage energy means connected across said load and having a series connected resistor, a capacitor connected parallel to said load, saturable switching transistor means having a collector-emitter path connected parallel with the load and having a base, and transistor trigger means connected with said saturable switching transistor means to form a bistable flip-flop for abruptly switching said saturable switching transistor means between on and off conditions in respective response to rise and fall of the load voltage from a datum voltage, said transistor trigger means including a switching transistor having a collector-emitter path connected parallel with the load and having a base, the base of said saturable switching transistor means being connected to the emitter-collector path of the transistor trigger means, and circuit impedance means connecting the base of said transistor trigger means to the emitter-collector path of said saturable switching transistor means.

5. A device for energizing a load with a constant voltage, comprising direct-voltage energy means connected across said load and having a series connected resistor, a capacitor connected parallel to said load, saturable switching transistor means, and transistor trigger means connected with said saturable switching transistor means to form a bistable flip-flop for abruptly switching said switching transistor means between on and off conditions in respective response to rise and fall of the load voltage from a datum voltage, said saturable transistor switching means including a pair of transistors having an emitter and a collector and a base, one of said transistors having an emitter connected with one of said load terminals, a resistor connected in series between the collector of said first transistor and said other load terminal, the emitter of said second transistor being connected to the base of said first transistor, and the collectors of said two transistors being connected with each other, respective valve diodes connected between the base and emitter of each of said respective transistors, auxiliary voltage supply means connected with said valve diodes for charging them by current in the blocking direction when said transistors are on and by current in the forward direction when said transistors are off, said transistor trigger means including a control transistor connected from the other terminal of said load to the base of said second transistor, and a Zener diode for establishing the voltage on the base of said control transistor.

6. A device for supplying current of regulated constant voltage, comprising two input terminals, two load terminals connected to said respective input terminals, impedance means connected in series between said input terminals and load terminals, a transistor having an emitter and a collector and a base, said emitter being connected with one of said load terminals and having the potential of said one terminal, a resistor connected in series between said collector and said other load terminal, a transistor network in connection with said transistor to form a bistable flip-flop, said network being connected across said two load terminals and having an output circuit connected to said base for switching said transistor substantially between on and off conditions, said network having a control circuit for controlling the duration of the on and off intervals of said transistor, an energy-storing capacitor connected across said load terminals, and Zener diode means connected between said other load terminal and said control circuit for controlling said network in response to departure of the load-terminal voltage from a given value, said network including a second transistor having an emitter and a collector and a base, the base of said second transistor being connected to the emitter of said first transistor and all collectors of said transistors being connected with each other, respective valve diodes connected between base and emitter of each of said respective transistors, voltage supply means connected with said valve diodes for charging them by current in the blocking direction when said transistors are on and by current in the forward direction when said latter transistors are off, said transistors having an output circuit connected with said control circuit and having an input circuit connected with said Zener diode means.

References Cited in the file of this patent

UNITED STATES PATENTS

| | | |
|---|---|---|
| 2,751,550 | Chase | June 19, 1956 |
| 2,776,382 | Jensen | Jan. 1, 1957 |
| 2,806,963 | Woll | Sept. 17, 1957 |
| 2,850,694 | Hamilton | Sept. 2, 1958 |
| 2,850,695 | Bishop | Sept. 2, 1958 |
| 2,963,637 | Osborn | Dec. 6, 1960 |
| 2,969,498 | Stenudd | Jan. 24, 1961 |

OTHER REFERENCES

"Transistorized Regulated Power Supplies," Lowery, Electronic Design, February 15, 1956, pp. 38–41.

"Transistorized Regulated Power Supplies—II," Lowery, Electronic Design, March 1, 1956, pp.32–35.